(12) United States Patent
Nixon et al.

(10) Patent No.: US 8,959,398 B2
(45) Date of Patent: Feb. 17, 2015

(54) MULTIPLE CLOCK DOMAIN DEBUG CAPABILITY

(75) Inventors: Scott P. Nixon, Fort Collins, CO (US); Eric M. Rentschler, Windsor, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 319 days.

(21) Appl. No.: 13/587,631

(22) Filed: Aug. 16, 2012

(65) Prior Publication Data

US 2014/0053027 A1 Feb. 20, 2014

(51) Int. Cl.
*G06F 11/00* (2006.01)

(52) U.S. Cl.
USPC .................................. 714/37; 714/25; 714/2

(58) Field of Classification Search
USPC .................................................. 714/2, 25, 37
See application file for complete search history.

(56) References Cited

U.S. PATENT DOCUMENTS

| | | | |
|---|---|---|---|
| 3,896,419 A | 7/1975 | Lange et al. |
| 5,210,843 A | 5/1993 | Ayers |
| 5,381,533 A | 1/1995 | Peleg et al. |
| 5,563,594 A | 10/1996 | Ford et al. |
| 5,669,003 A | 9/1997 | Carmean et al. |
| 5,764,885 A | 6/1998 | Sites et al. |
| 5,787,095 A | 7/1998 | Myers et al. |
| 5,881,261 A | 3/1999 | Favor et al. |
| 5,896,528 A | 4/1999 | Katsuno et al. |
| 5,930,497 A | 7/1999 | Cherian et al. |
| 5,944,841 A | 8/1999 | Christie |
| 6,014,742 A | 1/2000 | Krick et al. |
| 6,167,536 A | 12/2000 | Moann |
| 6,185,675 B1 | 2/2001 | Kranich et al. |
| 6,195,744 B1 | 2/2001 | Favor et al. |
| 6,205,508 B1 | 3/2001 | Bailey et al. |
| 6,212,628 B1 | 4/2001 | Abercrombie et al. |
| 6,216,206 B1 | 4/2001 | Peled et al. |
| 6,233,678 B1 | 5/2001 | Bala |
| 6,247,121 B1 | 6/2001 | Akkary et al. |
| 6,256,727 B1 | 7/2001 | McDonald |

(Continued)

FOREIGN PATENT DOCUMENTS

| | | |
|---|---|---|
| EP | 0 957 428 | 11/1999 |
| GB | 2 381 101 | 4/2003 |

(Continued)

OTHER PUBLICATIONS

Actions on the Merits for copending U.S. Appl. No. 13/572,249, filed Aug. 10, 2012, and Actions on the Merits for copending U.S. Appl. No. 13/328,512, filed Dec. 16, 2011.

(Continued)

*Primary Examiner* — Sarai Butler
(74) *Attorney, Agent, or Firm* — Polansky & Associates, P.L.L.C.; Paul J. Polansky

(57) ABSTRACT

An integrated circuit with debug capability includes a first packer and synchronizer to combine a multiple number of values of a first trigger signal received from a first circuit to form a first packed trigger signal and to output a synchronized first packed trigger signal in response to a trigger clock signal, the first trigger signal being synchronous with a first source clock signal, a first logic gate to provide a first output trigger signal indicative of whether any of the first multiple number of values of the first trigger signal in the first synchronized packed trigger signal is in a first state, and a debug state machine responsive to the first output trigger signal to selectively provide a first action signal.

20 Claims, 4 Drawing Sheets

(56) References Cited

U.S. PATENT DOCUMENTS

| | | | |
|---|---|---|---|
| 6,256,728 | B1 | 7/2001 | Witt et al. |
| 6,298,394 | B1 | 10/2001 | Edwards et al. |
| 6,311,296 | B1 | 10/2001 | Congdon |
| 6,321,290 | B1 | 11/2001 | Yamashita |
| 6,339,822 | B1 | 1/2002 | Miller |
| 6,345,295 | B1 | 2/2002 | Beardsley et al. |
| 6,357,016 | B1 | 3/2002 | Rodgers et al. |
| 6,449,714 | B1 | 9/2002 | Sinharoy |
| 6,493,821 | B1 | 12/2002 | D'Sa et al. |
| 6,578,128 | B1 | 6/2003 | Arsenault et al. |
| 6,633,838 | B1 | 10/2003 | Arimilli et al. |
| 6,658,519 | B1 | 12/2003 | Broberg et al. |
| 6,732,307 | B1 | 5/2004 | Edwards |
| 6,792,563 | B1 | 9/2004 | DesRosier et al. |
| 6,823,428 | B2 | 11/2004 | Rodriguez et al. |
| 6,834,365 | B2 | 12/2004 | Bardsley et al. |
| 6,839,654 | B2 | 1/2005 | Rollig et al. |
| 6,862,647 | B1 | 3/2005 | Hewitt |
| 6,909,760 | B2 | 6/2005 | Borowski et al. |
| 6,912,673 | B1 | 6/2005 | Wyland |
| 6,973,543 | B1 | 12/2005 | Hughes |
| 7,003,629 | B1 | 2/2006 | Alsup |
| 7,069,176 | B2 | 6/2006 | Swaine et al. |
| 7,197,630 | B1 | 3/2007 | Alsup |
| 7,200,776 | B2 | 4/2007 | Harris |
| 7,213,126 | B1 | 5/2007 | Smaus et al. |
| 7,555,633 | B1 | 6/2009 | Smaus et al. |
| 7,873,874 | B2 | 1/2011 | Choate et al. |
| 2002/0095553 | A1 | 7/2002 | Mendelson et al. |
| 2002/0144101 | A1 | 10/2002 | Wang et al. |
| 2003/0023835 | A1 | 1/2003 | Kalafatis et al. |
| 2004/0083352 | A1 | 4/2004 | Lee |
| 2004/0143721 | A1 | 7/2004 | Pickett et al. |
| 2004/0153874 | A1 | 8/2004 | Nitsch |
| 2004/0193857 | A1 | 9/2004 | Miller et al. |
| 2004/0216091 | A1 | 10/2004 | Groeschel |
| 2005/0033553 | A1 | 2/2005 | Swaine et al. |
| 2005/0076180 | A1 | 4/2005 | Smaus et al. |
| 2005/0125613 | A1 | 6/2005 | Kim et al. |
| 2005/0125632 | A1 | 6/2005 | Alsup et al. |
| 2009/0125756 | A1 | 5/2009 | Swaine et al. |
| 2009/0207306 | A1 | 8/2009 | Hagg |
| 2010/0106996 | A1 | 4/2010 | Chang et al. |
| 2010/0278195 | A1* | 11/2010 | Wagh et al. ............. 370/476 |
| 2010/0281308 | A1 | 11/2010 | Xu et al. |
| 2011/0122982 | A1* | 5/2011 | Yun et al. ............. 375/362 |
| 2011/0126051 | A1 | 5/2011 | Flautner et al. |
| 2011/0289302 | A1 | 11/2011 | Ubukata et al. |
| 2012/0144240 | A1 | 6/2012 | Rentschler et al. |
| 2012/0176909 | A1* | 7/2012 | Wagh et al. ............. 370/241 |
| 2012/0324290 | A1 | 12/2012 | Chen et al. |
| 2013/0159780 | A1 | 6/2013 | Bedwell et al. |

FOREIGN PATENT DOCUMENTS

| | | |
|---|---|---|
| GB | 2422464 | 6/2005 |
| GB | 2423852 | 9/2006 |
| WO | WO 2005/041024 | 5/2006 |

OTHER PUBLICATIONS

Arm Limited; ETM9, Revision: r2p2; Technical Reference Manual; 1999-2002; pp. 1-20; ARM DDI 0157F; ARM Inc., 150 Rose Orchard Way, San Jose, CA 95134-1358, U.S.A.

International Searching Authority; International Search Report and Written Opinion for PCT/US2004/039269, mailed Dec. 12, 2005, 11 pages; International Searching Authority, European Patent Office, P. B. 5818 Patentlaan 2, NL-2280 HV Rijswijk.

Yuan Chou and John Paul Shen; "Instruction Path Coprocessors"; Mar. 2000; 24 Pages; Carnegie Mellon University, Department of ECE, Pittsburgh, PA 15213.

Daniel Holmes Friendly, Sanjay Jeram Patel and Yale N. Patt; "Putting the Fill Unit to Work: Dynamic Optimizations for Trace Cache Microprocessors"; Dec. 1998; 9 pages; University of Michigan, Department of Electrical Engineering and Computer Science, Ann Arbor, Michigan 48109-2122.

Bryan Black and John Paul Shen; "Turboscalar: A High Frequency High IPC Microarchitecture"; Jun. 2000; 21 Pages; Carnegie Mellon University, Department of Electrical and Computer Engineering, Pittsburgh, PA 15213.

Matthew C. Merten, Andrew R. Trick, Ronald D. Barnes, Erik M. Nystrom, Christopher N. George, John C. Gyllenhaal and Wen-Mei W. Hwu; "An Architectural Framework for Run-Time Optimization"; Jun. 2001; 43 Pages; Center for Reliable and High-Performance Computing, 1308 West Main Street, MC-228, Urbana, IL 61801.

Glenn Hinton, Michael Upton, David J. Sager, Darrell Boggs, Douglas M. Carmean, Patrice Roussel, Terry I. Chappell, Thomas D. Fletcher, Mark S. Milshtein, Milo Sprague, Samie Samaan and Robert Murray; "A 0.18-MUM CMOS IA-32 Processor with a 4-GHZ Integer Execution Unit," IEEE Journal of Solid-State Circuits, vol. 36, No. 11, Nov. 2001, pp. 1617-1627.

Sanjay J. Patel and Steven S. Lumetta; "rePLAY: A Hardware Framework for Dynamic Optimization"; IEEE, vol. 50, No. 6, Jun. 2001, pp. 590-608.

Jacobson, Q. and Smith, J.E.; "Instruction Pre-Processing in Trace Processors"; IEEE Xplore, Jan. 1999, 6 pages.

Bryan Black, Bohuslav Rychlik and John Paul Shen; "The Block-Based Trace Cache"; IEEE, 1999, pp. 196-207; Carnegie Mellon University, Department of Electrical and Computer Engineering, Pittsburgh, PA 15213.

Mark Palmer and Stanley B. Zdonik; "Fido: A Cache That Learns to Fetch," Proceedings of the 17th International Conference on Very Large Data Bases, Barcelona, Sep. 1991, pp. 255-264.

Zhifeng Chen, Yuanyuan Zhou and Kai Li; "Eviction Based Cache Placement for Storage Caches," USENIX 2003 Annual Technical Conference, (13 pages).

An-Chow Lai, Cem Fide and Babak Falsafi; "Dead-Block Prediction & Dead-Block Correlating Prefetchers"; 2001 IEEE, 11 pages.

Brian Slechta, David Crowe, Brian Fahs, Michael Fertig, Gregory Muthler, Justin Quek, Francesco Spadini, Sanjay J. Patel and Steven S. Lumetta; "Dynamic Optimization of Micro-Operations"; 2002 IEEE, 12 pages.

Quinn Able Jacobson; "High-Performance Frontends for Trace Processors"; University of Wisconsin-Madison, 1999, pp. 19, 20, 36, 37, 104-122.

Huaxia, Xia; "Using Trace Cache in SMT", Jun. 10, 2001; 8 Pages.

Eric Rotenberg, Steve Bennett and James E. Smith; "Trace Cache: A Low Latency Approach to High Bandwidth Instruction Fetching"; Published in the Proceedings of the 29th Annual International Symposium on Microarchitecture, Dec. 2-4, 1996, pp. 24-35.

Grant Braught; "Class #21—Assemblers, Labels & Pseudo Instructions"; Nov. 16, 2000.

David A. Patterson and John L. Hennessy; "Computer Architecture: a Quantitative Approach", Morgan Kaufmann Publishers, Inc., 2nd Edition, 1996, pp. 271-278.

\* cited by examiner

MULTIPLE CLOCK DOMAIN DEBUG CAPABILITY

Related subject matter is found in a copending patent application entitled "Correlating Traces in a Computing System", U.S. patent application Ser. No. 13/328,512, filed Dec. 16, 2011, invented by Ryan D. Bedwell et al.; and a copending patent application entitled "Multiple Clock Domain Tracing", U.S. patent application Ser. No. 13/572,249, filed Aug. 10, 2012, invented by Scott P. Nixon et al.

FIELD

This disclosure relates generally to data processors, and more specifically to data processors with debug capability.

BACKGROUND

Consumers continue to demand computer systems with higher performance and lower cost. To address these challenges, integrated circuits are designed as systems on chips ("SoCs") and include an increasing number of modules, such as central processing units ("CPUs"), advanced processing units ("APUs"), graphics processing units ("GPUs"), memory sub-systems, system controllers, and complex peripheral functions. At the same time, gaining visibility into the operation of the system and determining that the system is operating as desired is increasingly difficult. The complexity and cost of finding and eliminating functional "bugs" provide significant challenges. Also, generating, storing, and analyzing the data required to determine if the defects are generally within the system, within a specific module, or between a set of modules present a significant challenge. These challenges become more difficult when it is important to analyze the operation of one circuit operating in one clock domain based on an event or set of events that take place in a different circuit that operates in a different clock domain that is asynchronous to the first circuit's clock domain.

Figure 1:
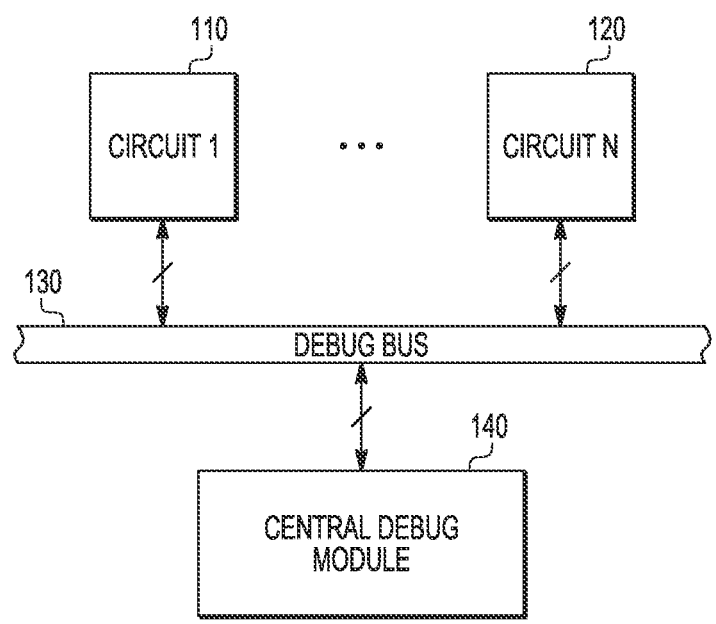
FIG. 1 illustrates in block diagram form a first integrated circuit with debug capability according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

FIG. 1 illustrates in block diagram form an integrated circuit 100 with debug capability according to some embodiments. Integrated circuit 100 generally includes a circuit 110 labeled "CIRCUIT 1", a circuit 120 labeled "CIRCUIT N", a debug bus 130, and a central debug module 140. Circuits 110 and 120, and central debug module 140, have an interface to transmit and receive a selected set of input and/or output signals over debug bus 130.

In operation, a multiple number of circuit blocks, such as representative circuits 110 and 120, each execute local logic functions based on timing edges provided by a local clock. Also, in response to executing local logic functions, each circuit block provides debug data, including "trigger" signals and "event" signals, to central debug module 140, over debug bus 130. Central debug module 140 brings the trigger and event signals from the clock domains of circuits 110 and 120 into a central location where useful actions, such as storing debug data in a trace buffer, can be meaningfully performed. In response to the trigger signals, central debug module 140 executes a programmable debug protocol. During debug, central debug module 140 has the capability to count events, sequence operations, control debug states, and store debug records. For each circuit, events include random and systematic events. Circuits 110 and 120 generate event signals after the occurrence of an error, in response to a performance monitor, during the execution of an interrupt routine, and the like. Also, based on an event or a series of events, a circuit may be programmed to provide a trigger, or a series of triggers, to initiate an action, such as counting an occurrence of an event or a certain number of events.

For example, circuit 110 provides debug data, including trigger signals and event signals, as a source synchronous data stream. Circuit 110 provides a source synchronous data stream and an associated local clock to provide a timing reference for the associated data. The multiple circuits, including circuit 110 and circuit 120, generally provide a clock that is asynchronous to all other source synchronous clocks.

However, for larger circuit blocks, the skew between a particular local clock and a debug clock is unknown. For integrated circuit 100, central debug module 140 provides debug capability for all circuit blocks. In particular, central debug module 140 captures debug data from multiple asynchronous sources, on certain debug clock edges. If the debug data is transitioning state during the capture time, central debug module 140 has the capability to correctly store the debug data. Moreover, central debug module 140 can capture debug data from any of the circuits based on a trigger generated by only one circuit, which aids debugging because information gathered from different debug domains may be relevant to debugging the operation of integrated circuit 100.

Figure 2:
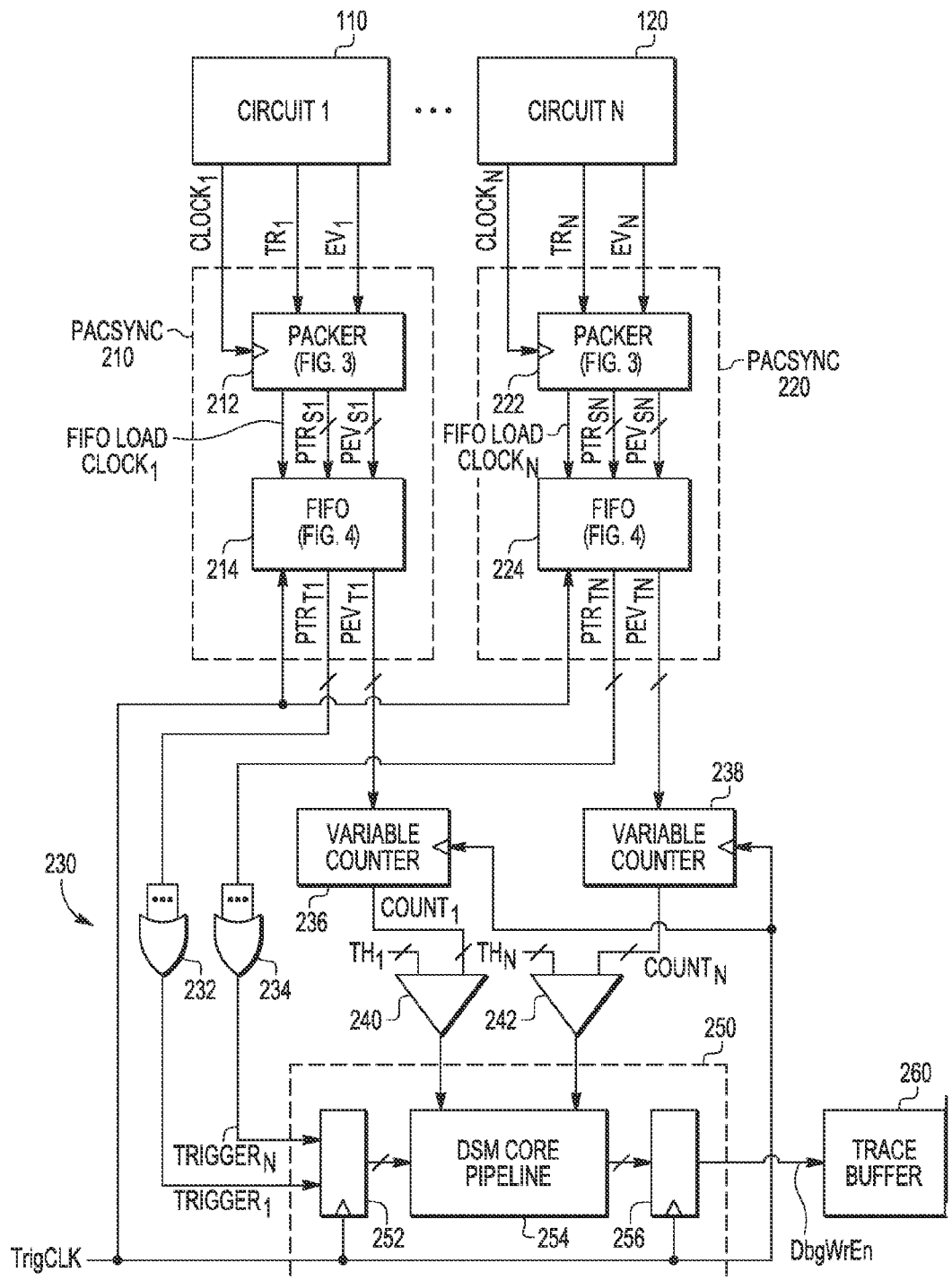
FIG. 2 illustrates in partial block diagram and partial logic diagram form a second integrated circuit with debug capability according to some embodiments.

FIG. 2 illustrates in partial block diagram and partial logic diagram form an integrated circuit 200 with debug capability according to some embodiments. Integrated circuit 200 generally includes circuits 110 and 120 of FIG. 1, a packer and synchronizer ("PACSYNC") 210, a PACSYNC 220, and a triggering domain 230.

Circuit 110 has an output for providing a clock signal labeled "$CLOCK_1$", an output for providing a trigger signal labeled "$TR_1$", and an output for providing an event signal labeled "$EV_1$". Circuit 120 has an output for providing a clock signal labeled "$CLOCK_2$", an output for providing a trigger signal labeled "$TR_2$", and an output for providing an event signal labeled "$EV_2$".

PACSYNC 210 includes a packer 212 and a first-in, first-out buffer ("FIFO") 214. Packer 212 has an input for receiving signal $CLOCK_1$, an input for receiving signal TR1, an input for receiving signal FYI, an output for providing a set of packed trigger signals labeled "$PTR_{S1}$", an output for providing a set of packed event signals labeled "PEV$_{S1}$", and an output for providing a clock signal labeled "FIFO LOAD CLOCK$_1$". FIFO 214 has an input for receiving the PTR$_{S1}$ signals, an input for receiving the PEV$_{S1}$ signals, an input for receiving the FIFO LOAD CLOCK$_1$ signal, an input for receiving a clock signal labeled "TrigCLK", an output for providing a set of synchronized packed trigger signals labeled "PTR$_{T1}$", and an output for providing a set of synchronized packed event signals labeled "PEV$_{T1}$".

PACSYNC 220 includes a packer 222 and a FIFO 224. Packer 222 has an input for receiving signal CLOCK$_N$, an input for receiving signal TR$_N$, an input for receiving signal EV$_N$, an output for providing a set of packed trigger signals labeled "PTR$_{SN}$", an output for providing a set of packed event signals labeled "PEV$_{SN}$", and an output for providing a clock signal labeled "CLOCK$_N$". FIFO 224 has an input for receiving the PTR$_{SN}$ signals, an input for receiving the PEV$_{SN}$ signals, an input for receiving the FIFO LOAD CLOCK$_N$ signal, an input for receiving signal TrigCLK, an output for providing a set of synchronized packed trigger signals labeled "PTR$_{TN}$", and an output for providing a set of synchronized packed event signals labeled "PEV$_{TN}$".

Triggering domain 230 includes a logic gate 232, a logic gate 234, a variable counter 236, a variable counter 238, a comparator 240, a comparator 242, a debug state machine ("DSM") 250, and a trace buffer 260. Logic gate 232 has an input for receiving the set of synchronized packed trigger signals provided by FIFO 214, and an output for providing a single trigger signal labeled "TRIGGER$_1$". Logic gate 234 has an input for receiving the set of synchronized packed trigger signals provided by FIFO 224, and an output for providing a single trigger signal "TRIGGER$_N$". Variable counter 236 has an input for receiving signals PEV$_{T1}$, an input for receiving TrigCLK, and an output for providing a set of count signals labeled "COUNT$_1$". Variable counter 238 has an input for receiving the set of synchronized packed event signals provided by FIFO 224, an input for receiving TrigCLK, and an output for providing a set of count signals labeled "COUNT$_N$". Comparator 240 has an input for receiving a multi-hit threshold signal labeled "TH$_1$", an input for receiving signals COUNT$_1$, and an output. Comparator 242 has an input for receiving a multi-bit threshold signal labeled "TH$_N$", an input for receiving signals COUNT$_N$, and an output.

DSM 250 includes a synchronization latch 252, a DSM core pipeline 254, and a synchronization latch 256. Synchronization latch 252 has an input for receiving the single trigger signal of logic gate 232, an input for receiving the single trigger signal of logic gate 234, an input for receiving TrigCLK, and an output for providing a set of signals. DSM core pipeline 254 has an input for receiving the set of signals provided by synchronization latch 252, an input connected to the output of comparator 240, an input connected to the output of comparator 242, and an output for providing a set of action signals. Synchronization latch 256 has an input for receiving the set of action signals provided by DSM core pipeline 254, an input for receiving TrigCLK, and an output for providing a set of latched action signals including an exemplary signal labeled "DbgWrEn". Trace buffer 260 has an input for receiving DbgWrEn, and other inputs and outputs, not shown in FIG. 2, for storing and outputting trace data.

In operation, integrated circuit 200 includes a multiple number of circuit blocks, such as representative circuits 110 and 120, representative PACSYNC circuits 210 and 220, representative logic gates 232 and 234, representative variable counter circuits 236 and 238, and representative comparators 240 and 242. In general, representative circuits 110 and 120 provide debug data, including trigger signals and event signals, as a source synchronous data stream. Also, representative circuits 110 and 120 provide a local clock that is asynchronous to all other local clocks.

Circuit 110 provides a local source clock to PACSYNC 210. Circuit 110 and a portion of PACSYNC 210 operate in the "source domain", where a local logic operation is a function of timing edges of the local clock. Also, circuit 110 provides a series of trigger signals and a series of event signals to PACSYNC 210. In response, PACSYNC 210 performs a serial-to-parallel conversion of the signals, and provides a set of synchronized "packed" trigger signals and a set of synchronized packed event signals to triggering domain 230, synchronous to TrigCLK.

In particular, packer 212 generates the set of packed trigger signals and the set of packed event signals and provides both sets of signals to FIFO 214. In response, FIFO 214 manages the signals by storing the signals in sequential locations based on the order received. Also, FIFO 214 provides a set of synchronized trigger signals and a set of synchronized event signals to triggering domain 230, synchronous to TrigCLK. Since, in the source domain, circuit 110 provides the local source clock asynchronous to TrigCLK, the synchronization logic of FIFO 214 provides a stable glitch-free transfer of the packed trigger signals and the packed event signals to triggering domain 230. Within triggering domain 230, particular circuits execute local logic functions using edges of TrigCLK.

Likewise, circuit 120 provides a different local source clock to PACSYNC 220. Circuit 120 and a portion of PACSYNC 220 operate in the source domain, where a local logic operation is a function of timing edges of the local clock. Also, circuit 120 provides a series of trigger signals and a series of event signals to PACSYNC 220. In response, PACSYNC 220 performs a serial-to-parallel conversion of the signals, and provides a set of synchronized packed trigger signals and a set of synchronized packed event signals, to triggering domain 230, synchronous to TrigCLK.

In particular, packer 222 generates the set of packed trigger signals and the set of packed event signals and provides both sets of signals to FIFO 224. In response, FIFO 224 manages the signals by storing the signals in sequential locations based on the order received. Also, FIFO 224 provides a set of synchronized trigger signals and a set of synchronized event signals to triggering domain 230, synchronous to TrigCLK. Since, in the source domain, circuit 120 provides the local source clock asynchronous to TrigCLK, the synchronization logic of FIFO 224 provides a stable glitch-free transfer of the packed trigger signals and the packed event signals to triggering domain 230. Within triggering domain 230, particular circuits execute local logic functions using edges of TrigCLK.

In some embodiments, to prevent loss of data, when data is transferred from the source domain to triggering domain 230, PACSYNC circuits 210 and 220 are configured to be N-bits wide, where "N" is defined as the ratio of the frequency of the source domain clock divided by the frequency of TrigCLK, rounded up to the nearest whole number. For example, FIFO 214 includes adequate control and a sufficient number of locations ("FIFO depth"), so that the write pointer and read pointer generally do not overflow or underflow with respect to each other. Packer 212 packs the series of trigger signals and the series of event signals, after N local clock cycles, into unique bits of N-bit wide FIFO 214, where the data flows through the depth of FIFO 214.

Triggering domain 230 includes circuit blocks with the capability to provide centralized debug for integrated circuit 200. For example, FIFO 214 provides the set of synchronized packed trigger signals to logic gate 232, and logic gate 232 provides a single composite trigger signal to indicate whether any one of the signals is in a certain state.

Also, FIFO 214 provides the set of synchronized packed event signals to variable counter 236. Variable counter 236 increments on TrigCLK edges by a variable amount that corresponds to the number of signal bits that are in a certain state to provide an output count that represents the cumulative total of events over multiple cycles. Variable counter 236 provides the output count to comparator 240, and comparator 240 compares the output count to a threshold value. If the output count signal exceeds the threshold value, comparator 240 provides a trigger signal to DSM core pipeline 254.

Synchronization latch 252 latches the output of each logic gate, synchronous to TrigCLK. Since the FIFOs have already synchronized the logic gate input signals to TrigCLK, synchronization latch 252 may simply latch the signals on a TrigCLK edge, or may further synchronize the signals to TrigCLK. Also, synchronization latch 252 provides the latched trigger signals to DSM core pipeline 254.

DSM core pipeline 254 includes, among other functions, a series of data processing stages, programmable control registers, control logic, and timing logic. DSM 250 has the capability to concurrently manage multiple events, and multiple trigger signals provided by multiple comparators and multiple logic gates. According to certain programmable protocols, and responsive to decisions made in the pipeline processing stages, DSM core pipeline 254 selectively provides action signals to synchronization latch 256. Synchronization latch 256 may simply latch an active action signal on a TrigCLK edge, or may further synchronize the action signal to TrigCLK. For example, DSM core pipeline 254 may provide a particular action signal based on receiving a single selected trigger signal, based on a certain combination of triggers, based on a certain defined sequence of multiple triggers, based on a timing delay, based on a certain number of cycles between triggers, and so on. Also, DSM core pipeline 254 may provide an action signal based on performing a certain operation between triggers, such as an exclusive OR function.

Synchronization latch 256 provides the latched action signals, such as action signal DbgWrEn, to trace buffer 260. In response to DbgWrEn, trace buffer 260 stores debug data that represents activities of representative circuits 110 and 120, and data that includes other system information gathered during debug. Also, enabled by DbgWrEn, trace butler 260 enables the storing of a source synchronous data stream, filters the rules that define how trace records are stored, starts and stops clocks that synchronize and store trace records, and provides a system debug mode interrupt based on certain results of the trace records. System resources can then access trace buffer 260 to analyze the debug data.

Although each source clock has an indeterminate phase and frequency relationship with respect to all other source clocks, integrated circuit 200 provides lossless transfer of all trigger and event signals to the triggering domain. Each of PACSYNC circuits 210 and 220 performs a serial-to-parallel conversion of the signals, and provides a stable glitch-free transfer of the source synchronous data to debug state machine 250. Debug state machine 250 can then operate in a separate triggering domain with signal TrigCLK that is asynchronous to the local clocks. In addition, debug state machine 250 can concurrently manage multiple trigger signals and multiple events, to selectively provide an action signal, or a stream of action signals, to trace buffer 260.

Figure 3:
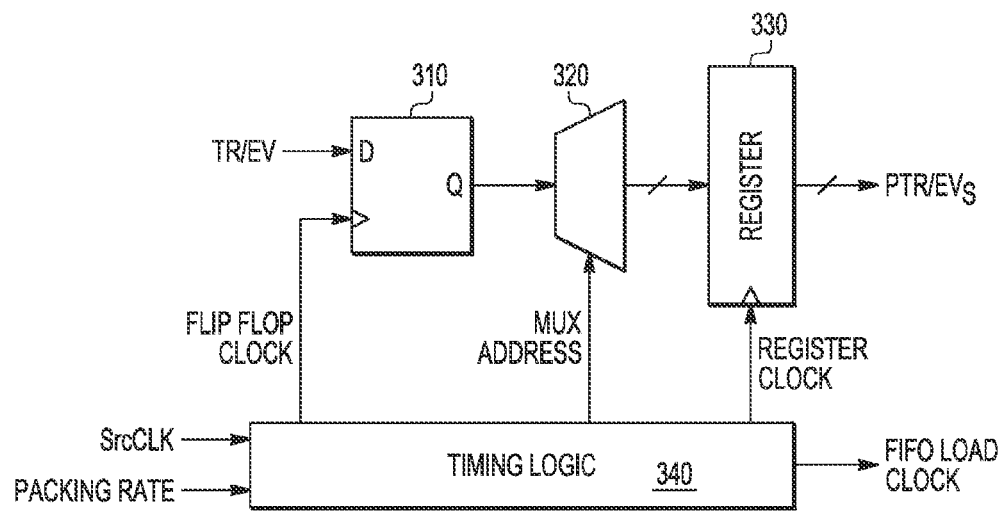
FIG. 3 illustrates in block diagram form a packer that may be used to implement the packers of FIG. 2 according to some embodiments.

FIG. 3 illustrates in block diagram form a packer that may be used to implement packers 212 and 222 of FIG. 2 according to some embodiments. Packer 300 generally includes a flip-flop 310, a demultiplexor 320, a register 330, and timing logic 340.

Flip-flop 310 has a data input labeled "D" for receiving a signal labeled TR/EV, an input for receiving a clock signal labeled "FLIP FLOP CLOCK", and an output labeled "Q" connected to an input of demultiplexor 320. Demultiplexor 320 has an input for receiving a signal labeled "MUX ADDRESS", and a multi-bit output connected to an input of register 330. Register 330 has an input for receiving a signal labeled "REGISTER CLOCK", and an output for providing a set of signals labeled "PTR/EV$_S$". Timing logic 340 has an input for receiving a signal labeled "SrcCLK", an input for receiving a signal labeled "PACKING RATE", an output for providing FLIP FLOP CLOCK, an output for providing MUX ADDRESS, an output for providing REGISTER CLOCK, and an output for providing a signal labeled "FIFO LOAD CLOCK".

In operation, packer 300 combines both trigger signals and event signals. Packer 300 operates in the source domain, synchronous to SrcCLK dock edges, and includes a dual port input, to convert a series of trigger signals/event signals, TR/EV, into parallel packed trigger signals/event signals, PTR/EV$_S$. For PTR/EV$_S$, the "S" subscript notation indicates the source domain. Timing logic 340 provides FLIP FLOP CLOCK with the same frequency and the same phase relationship as SrcCLK but provides REGISTER CLOCK at a slower frequency than SrcCLK, but synchronous and in phase with SrcCLK. Also, timing logic 340 initializes MUX ADDRESS on a REGISTER CLOCK edge, and increments MUX ADDRESS on each SrcCLK edge.

For each FLIP FLOP CLOCK edge, flip-flop 310 captures TR/EV and provides TR/EV to demultiplexor 320. Timing logic 340 provides MUX ADDRESS to demultiplexor 320 and demultiplexor 320 cycles through selected bit locations as a function of MUX ADDRESS edges. In particular, demultiplexor 320 provides trigger signals/event signals to selected bit positions of register 330. Timing logic 340 provides REGISTER CLOCK to register 330, and register 330 latches the trigger signals/event signals on a REGISTER CLOCK edge. To prevent loss of data, timing logic 340 controls the rate of conversion of serial bits to parallel bits stored in register 330, as a function of PACKING RATE. Register 330 provides a set of packed trigger signals/packed event signals, and FIFO LOAD CLOCK to the downstream FIFO.

Figure 4:
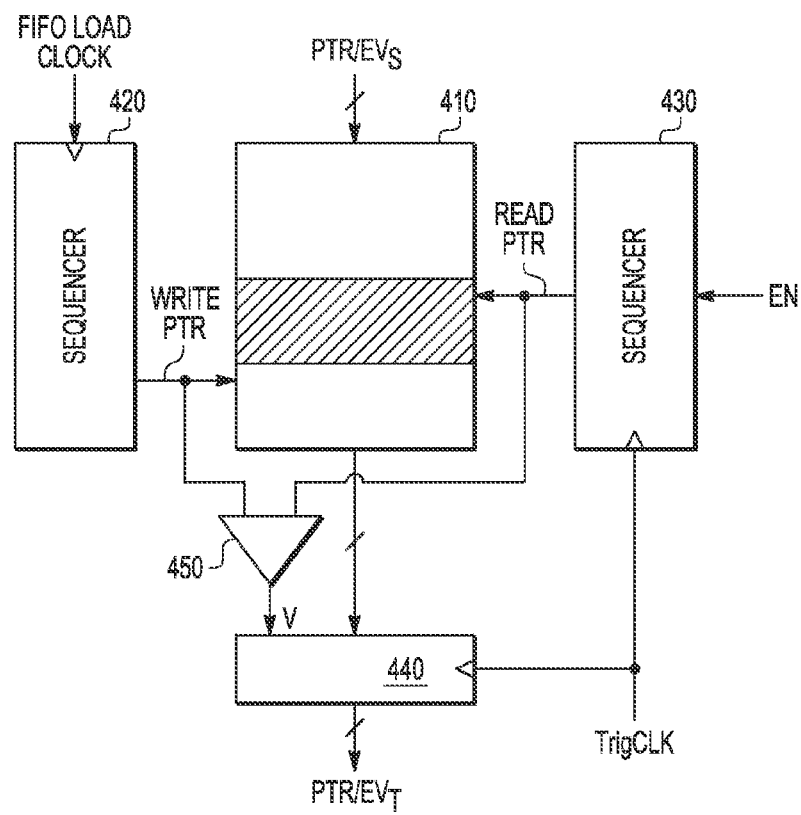
FIG. 4 illustrates in block diagram form a first-in, first-out buffer "FIFO") that may be used to implement the FIFOs of FIG. 2 according to some embodiments.

FIG. 4 illustrates in block diagram form a FIFO that may be used to implement FIFOs 214 and 224 of FIG. 2 according to some embodiments. FIFO 400 generally includes a store 410, a sequencer 420, a sequencer 430, a synchronization latch 440, and a comparator 450.

Store 410 has an input for receiving a signal labeled "WRITE PTR", an input for receiving a set of signals labeled "PTR/EV$_S$", an input for receiving a signal labeled "READ PTR", and an output for providing a set of packed trigger and event signals to the triggering domain. Sequencer 420 has a clock input for receiving a signal labeled "FIFO LOAD CLOCK", and an output for providing WRITE PTR, Sequencer 430 has an input for receiving a signal labeled "EN", an input for receiving TrigCLK, and an output for providing READ PTR. Synchronization latch 440 has an input for receiving a signal labeled "V", an input for receiving the set of packed trigger and event signals provided by store 410, an input for receiving TrigCLK, and an output for providing a set of signals labeled "PTR/EV$_T$". Comparator 450 has an input for receiving WRITE PTR, an input for receiving READ PTR, and an output for providing V.

In operation, FIFO 400 synchronizes both trigger signals and event signals between the source clock domain and the triggering domain. Packer 300 provides PTR/EV$_S$ to FIFO 400 and FIFO 400 transfers signals from the source domain (PTR/EV$_S$) to triggering domain 230 (PTR/EV$_T$ signals). For PTR/EV$_S$, the "S" subscript notation indicates the source domain, and for PR/EV$_T$, the "T" subscript notation indicates triggering domain 230.

In particular, for writing data, sequencer 420 increments WRITE PTR as a function of FIFO LOAD CLOCK edges, to indicate the next available empty location in store 410. Store 410 stores the incoming set of packed signals, PR/EV$_S$, in the location pointed to by WRITE PTR. Also, when enabled by EN, for reading data, sequencer 430 increments READ PTR as a function of TrigCLK, to indicate the next available location from store 410. Store 410 provides the data from the location pointed to by READ PTR to synchronization latch 440. Synchronization latch 440 provides a stable glitch-free transfer of PTR/EV$_T$ signals to triggering domain 230 synchronous to TrigCLK.

To prevent an overflow condition, the depth of store 410 includes a sufficient number of storage locations. Also, to prevent an underflow condition, sequencer 420 increments WRITE PTR on FIFO LOAD CLOCK edges, with sufficient timing, to input a sufficient amount of PTR/EV$_S$ data. When integrated circuit 200 provides an initialization sequence to FIFO 400, WRITE PTR and READ PTR are initialized to point at the same initial memory location. After initialization, READ PTR increments towards the value of WRITE PTR. For an underflow condition, store 410 is defined as empty, if READ PTR increments through FIFO storage locations and points to the same location as WRITE PTR. Also, for an overflow condition, store 410 is defined as full, if WRITE PTR increments through FIFO storage locations and points to the same location as READ PTR.

Conceptually, comparator 450 provides a continuous comparison of WRITE PTR to READ PTR. Comparator 450 asserts valid signal "V" when WRITE PTR is not equal to READ PTR. If WRITE PTR increments faster than READ PTR and eventually wraps around and equals READ PTR, then comparator 450 detects an overflow condition and negates signal V. If READ PTR increments faster than WRITE PTR and eventually equals WRITE PTR, then comparator 450 detects an underflow condition and negates signal V. When comparator 450 negates signal V, synchronization latch 440 will not provide additional PTR/EV$_T$ signals to triggering domain 230.

Figure 5:
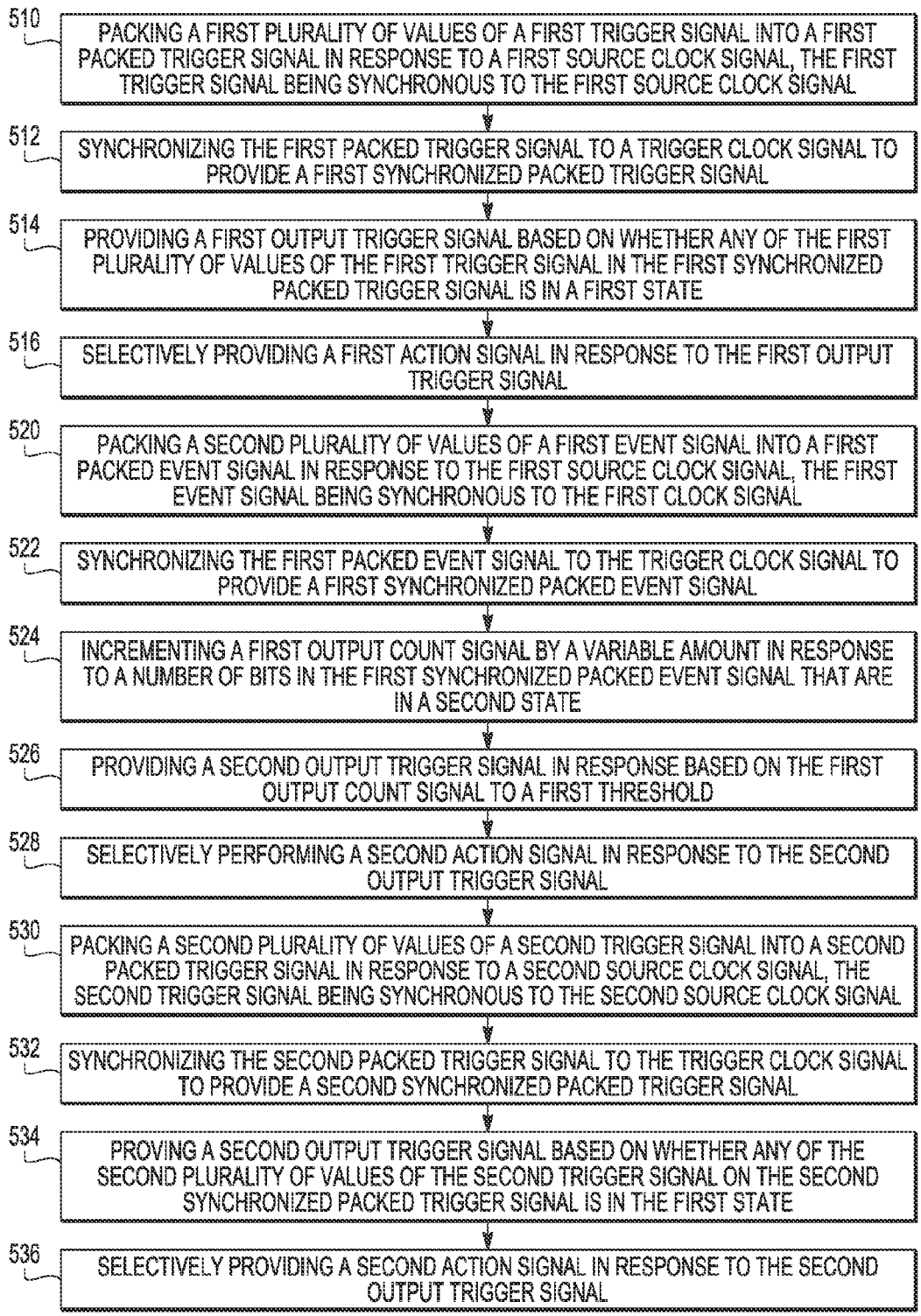
FIG. 5 illustrates a flow diagram of a method according to some embodiments.

FIG. 5 illustrates a flow diagram 500 of a method according to some embodiments, Action box 510 includes packing a first plurality of values of a first trigger signal into a first packed trigger signal in response to a first source clock signal, the first trigger signal being synchronous to the first source clock signal. Action box 512 includes synchronizing the first packed trigger signal to a trigger clock signal to provide a first synchronized packed trigger signal. Action box 514 includes providing a first output trigger signal based on whether any of said first plurality of values of said first trigger signal in said first synchronized packed trigger signal is in a first state. Action box 518 includes selectively providing a first action signal in response to said first output trigger signal.

In some embodiments, method 500 further includes an action box 520 including packing a second plurality of values of a first event signal into a first packed event signal in response to the first source clock signal, the first event signal being synchronous to the first clock signal. Action box 522 includes synchronizing the first packed event signal to the trigger clock signal to provide a first synchronized packed event signal. Action box 524 includes incrementing a first output count signal by a variable amount in response to a number of bits in the first synchronized packed event signal that are in a second state. Action box 526 includes providing a second output trigger signal in response based on the first output count signal to a first threshold. Action box 528 includes selectively performing a second action signal in response to the second output trigger signal.

In some embodiments, method 500 still further includes an action box 530 including packing a second plurality of values of a second trigger signal into a second packed trigger signal in response to a second source clock signal, said second trigger signal being synchronous to the second source clock signal. Action box 532 includes synchronizing said second packed trigger signal to said trigger clock signal to provide a second synchronized packed trigger signal. Action box 534 includes providing a second output trigger signal based on whether any of said second plurality of values of said second trigger signal in said second synchronized packed trigger signal is in said first state. Action box 536 includes selectively performing a second action signal in response to said second output trigger signal.

The tracing functions of the integrated circuit of FIGS. 1 and 2 may be implemented with various combinations of hardware and software, and the software component may be stored in a computer readable storage medium for execution by at least one processor. Moreover the method illustrated in FIG. 5 may also be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, integrated circuits 100 and 200 may be described or represented by a computer accessible data structure in the form of a database or other data structure which can be read by a program and used, directly or indirectly, to fabricate integrated circuits 100 or 200. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits 100 or 200. The netlist may then be placed and routed to produce a data set describing geometric shapes to be applied to masks. The masks may then be used in various semiconductor fabrication steps to produce integrated circuits 100 or 200. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, representative circuits 110 and 120 can be formed by a variety of elements including a GPU, a CPU core, an APU, a memory sub-system, a system controller (a "north bridge" or a "south bridge"), complex peripheral functions, and so on, and sub-circuits of each of them. Also, in some embodiments, integrated circuits 100 and 200 include a certain number of functional blocks, where a functional block could include a certain set of GPUs, CPU cores, APUs, memory sub-systems, system controllers, complex peripheral functions, and so on. For example, in some embodiments, representative circuit 110 includes a. CPU core, an APU, and a Universal Serial Bus ("USB") controller, and representative circuit 120 could include a memory sub-system and a bus arbitration module. In the illustrated embodiments, logic gates 232 and/or 234 perform a logic OR function for active high trigger signals, but in another embodiment they could be implemented with a logic NAND function for active low trigger signals.

Accordingly, it is intended by the appended claims to cover all modifications of the disclosed embodiments that fall within the scope of the disclosed embodiments.

What is claimed is:

1. An integrated circuit with multiple clock domain debug capability comprising:
a first packer and synchronizer to combine a first plurality of values of a first trigger signal received from a first circuit to form a first packed trigger signal and to output a synchronized first packed trigger signal in response to a trigger clock signal, said first trigger signal being synchronous with a first source clock signal;
a first logic gate to provide a first output trigger signal indicative of whether any of said first plurality of values of said first trigger signal in said first synchronized packed trigger signal is in a first state; and
a debug state machine responsive to said first output trigger signal to selectively provide a first action signal.

2. The integrated circuit of claim 1 further comprising:
a second packer and synchronizer to combine a second plurality of values of a second trigger signal received from a second circuit to form a second packed trigger signal and to output a second synchronized packed trigger signal in response to said trigger clock signal, said second trigger signal being synchronous with a second source clock signal; and
a second logic gate to provide a second output trigger signal indicative of whether any of said second plurality of values of said second trigger signal in said second synchronized packed trigger signal is in a second state.

3. The integrated circuit of claim 2 wherein said debug state machine is further responsive to said second output trigger signal to selectively provide a second action signal.

4. The integrated circuit of claim 2 wherein said first circuit comprises a graphics processing unit (CPU).

5. The integrated circuit of claim 4, wherein said second circuit comprises a central processing unit (CPU) core.

6. The integrated circuit of claim 2, wherein said first circuit comprises a first internal circuit in a graphics processing unit (GPU), and said second circuit comprises a second internal circuit in said GPU.

7. The integrated circuit of claim 1, wherein said first logic gate performs a logic OR function.

8. The integrated circuit of claim 1, wherein said first packer and synchronizer comprises:
a first packer circuit to provide said first packed trigger signal comprising said first plurality of values of said first trigger signal responsive to said first source clock signal; and
a first first-in, first-out buffer coupled to said first packer circuit to store values of said first packed trigger signal synchronously with said first source clock signal, and to read values of said first packed trigger signal synchronously with said trigger clock signal to provide said first synchronized packed trigger signal.

9. The integrated circuit of claim 1, further comprising a trace buffer having an enable input to receive said first action signal, wherein said trace buffer stores a plurality of signals from said first circuit in response to said first action signal.

10. An integrated circuit with multiple clock domain debug capability comprising:
a first packer and synchronizer to combine a plurality of values of a first event signal received from a first circuit to form a first packed event signal and to output a first synchronized packed event signal in response to a trigger clock signal, said first event signal being synchronous with a first source clock signal;
a first variable counter having an output to provide a first output count signal and to successively increment said first output count signal in response to transitions of said trigger clock signal by variable amounts corresponding to numbers of bits in said first synchronized packed event signal that are in a first state;
a first comparator to compare said first output count signal to a first threshold and providing a first trigger signal in response thereto; and
a debug state machine responsive to said first trigger signal to selectively provide a first action signal.

11. The integrated circuit of claim 10 further comprising:
a second packer and synchronizer to combine a plurality of values of a second event signal received from a second circuit to for a second packed event signal and to output a second synchronized packed event signal in response to a trigger clock signal, said first event signal being synchronous with a second source clock signal; and
a second variable counter having an output to provide a second output count signal and to successively increment said second output count signal in response to said trigger clock signal by variable amounts corresponding to numbers of bits in said second synchronized packed event signal that are in a second state; and
a second comparator to compare said second output count signal to a second threshold and to provide a second trigger signal in response thereto.

12. The integrated circuit of claim 11 wherein said debug state machine is further responsive to said second trigger signal to selectively provide a second action signal.

13. The integrated circuit of claim 11 wherein said first circuit comprises a graphics processing unit (CPU).

14. The integrated circuit of claim 13, wherein said second circuit comprises a central processing unit (CPU) core.

15. The integrated circuit of claim 11, wherein said first circuit comprises a first internal circuit in a graphics processing unit (CPU), and said second circuit comprises a second internal circuit in said CPU.

16. The integrated circuit of claim 10, wherein said first packer and synchronizer comprises:
a first packer circuit to provide said first packed event signal comprising said plurality of values of said first event signal responsive to said first source clock signal; and
a first first-in, first-out buffer coupled to said first packer circuit to store values of said first packed event signal synchronously with said first source clock signal, and to read values of said first packed event signal synchronously with said trigger clock signal to provide said first synchronized packed event signal.

17. The integrated circuit of claim 10, further comprising a trace buffer having an enable input to receive said first action signal, wherein said trace buffer stores a plurality of signals from said first circuit in response to said first action signal.

18. A method comprising:
    packing a first plurality of values of a first trigger signal into a first packed trigger signal in response to a first source clock signal, said first trigger signal being synchronous to the first source clock signal;
    synchronizing said first packed trigger signal to a trigger clock signal to provide a first synchronized packed trigger signal;
    providing a first output trigger signal based on whether any of said first plurality of values of said first trigger signal in said first synchronized packed trigger signal is in a first state; and
    selectively providing a first action signal in response to said first output trigger signal.

19. The method of claim 18 further comprising:
    packing a second plurality of values of a first event signal into a first packed event signal in response to said first source clock signal, said first event signal being synchronous to said first clock signal;
    synchronizing said first packed event signal to said trigger clock signal to provide a first synchronized packed event signal;
    incrementing a first output count signal by a variable amount in response to a number of bits in said first synchronized packed event signal that are in a second state;
    providing a second output trigger signal in response based on said first output count signal to a first threshold; and
    selectively performing a second action signal in response to said second output trigger signal.

20. The method of claim 18 further comprising:
    packing a second plurality of values of a second trigger signal into a second packed trigger signal in response to a second source clock signal, said second trigger signal being synchronous to the second source clock signal;
    synchronizing said second packed trigger signal to said trigger clock signal to provide a second synchronized packed trigger signal;
    providing a second output trigger signal based on whether any of said second plurality of values of said second trigger signal in said second synchronized packed trigger signal is in said first state; and
    selectively performing a second action signal in response to said second output trigger signal.

* * * * *

UNITED STATES PATENT AND TRADEMARK OFFICE
CERTIFICATE OF CORRECTION

| | | |
|---|---|---|
| PATENT NO. | : 8,959,398 B2 | Page 1 of 1 |
| APPLICATION NO. | : 13/587631 | |
| DATED | : February 17, 2015 | |
| INVENTOR(S) | : Scott P. Nixon et al. | |

It is certified that error appears in the above-identified patent and that said Letters Patent is hereby corrected as shown below:

In the Specification:

In column 2, line 66, replace "FYI," with "EV1,".

In column 3, line 40, replace "multi-hit" with "multi-bit".

In column 3, line 46, replace "256," with "256.".

In column 5, line 48, replace "butler" with "buffer".

In column 6, line 23, replace "dock" with "clock".

In column 6, line 59, replace "PTR," with "PTR.".

In column 7, line 51, replace "embodiments," with "embodiments.".

In the Claims:

In claim 4, line 2, replace "(CPU)." with "(GPU).".

In claim 13, line 2, replace "(CPU)." with "(GPU).".

In claim 15, line 3, replace "(CPU)," with "(GPU),".

In claim 15, line 4, replace "CPU." with "GPU.".

Signed and Sealed this
Fifteenth Day of December, 2015

Michelle K. Lee
*Director of the United States Patent and Trademark Office*